(12) United States Patent
Fujihara et al.

(10) Patent No.: US 9,049,876 B2
(45) Date of Patent: Jun. 9, 2015

(54) COMPOSITION FOR IMPROVING TASTE OF HIGH-INTENSITY SWEETENER AND APPLICATION THEREOF

(75) Inventors: Hideki Fujihara, Itami (JP); Tomohiro Enomoto, Itami (JP)

(73) Assignee: MATSUTANI CHEMICAL INDUSTRY CO., LTD., Itami-shi (JP)

( * ) Notice: Subject to any disclaimer, the term of this patent is extended or adjusted under 35 U.S.C. 154(b) by 165 days.

(21) Appl. No.: 13/248,281

(22) Filed: Sep. 29, 2011

(65) Prior Publication Data

US 2012/0076908 A1 Mar. 29, 2012

(30) Foreign Application Priority Data

Sep. 29, 2010 (JP) ................. 2010-219763

(51) Int. Cl.
  *A23L 1/236* (2006.01)
  *A23L 1/09* (2006.01)
  *A23L 1/22* (2006.01)
  *A23L 2/60* (2006.01)
  *A23G 9/34* (2006.01)

(52) U.S. Cl.
  CPC ............... *A23L 1/09* (2013.01); *A23L 1/22075* (2013.01); *A23L 1/22083* (2013.01); *A23L 1/236* (2013.01); *A23L 2/60* (2013.01); *A23G 9/34* (2013.01)

(58) Field of Classification Search
  CPC ....... A23L 1/09; A23L 1/236; A23L 1/22075; A23L 1/22083; A23L 2/60; A23G 9/34
  USPC .................................................. 426/548, 658
  See application file for complete search history.

(56) References Cited

U.S. PATENT DOCUMENTS

| | | | |
|---|---|---|---|
| 4,455,333 A * | 6/1984 | Hong et al. ............. | 426/94 |
| 5,411,880 A | 5/1995 | Izumori et al. | |
| 5,679,562 A | 10/1997 | Izumori et al. | |
| 2007/0116825 A1 | 5/2007 | Prakash et al. | |
| 2007/0116828 A1 | 5/2007 | Prakash et al. | |
| 2007/0116832 A1 | 5/2007 | Prakash et al. | |
| 2007/0128311 A1 | 6/2007 | Prakash et al. | |
| 2007/0134390 A1 | 6/2007 | Prakash et al. | |
| 2007/0134391 A1 | 6/2007 | Prakash et al. | |
| 2007/0224321 A1 | 9/2007 | Prakash et al. | |
| 2007/0275147 A1 | 11/2007 | Prakash et al. | |
| 2008/0107775 A1 | 5/2008 | Prakash et al. | |
| 2008/0107776 A1 | 5/2008 | Prakash et al. | |
| 2008/0107787 A1 | 5/2008 | Prakash et al. | |
| 2008/0108710 A1 | 5/2008 | Prakash et al. | |
| 2008/0292765 A1 * | 11/2008 | Prakash et al. ............. | 426/548 |
| 2009/0053378 A1 | 2/2009 | Prakash et al. | |
| 2009/0304891 A1 | 12/2009 | Fujihara et al. | |
| 2012/0094940 A1 | 4/2012 | Takamine et al. | |

FOREIGN PATENT DOCUMENTS

| | | |
|---|---|---|
| JP | 06-125776 A | 5/1994 |
| JP | 2002-034501 A | 2/2002 |
| JP | 2002-051723 A | 2/2002 |
| JP | 2004-041118 A | 2/2004 |
| WO | 2008/059623 A1 | 5/2008 |
| WO | 2010/113785 A1 | 7/2010 |
| WO | 2010/113785 A1 | 10/2010 |

* cited by examiner

*Primary Examiner* — Leslie Wong
(74) *Attorney, Agent, or Firm* — Westerman, Hattori, Daniels & Adrian, LLP

(57) ABSTRACT

An object of the present invention is to improve a distinctive strange taste (particularly bitterness remaining in the mouth) of a conventional low-calorie food or drink, particularly an edible product (a food or drink) having low calories obtained by replacing part or most of the sugar or isomerized sugar to be added by a high-intensity sweetener. Provided are a composition for improving a taste of a high-intensity sweetener, a method of improving a taste of an edible product containing a high-intensity sweetener, and an edible product in which a taste of a high-intensity sweetener is improved, each of which is characterized by containing or using an isomerized sugar and a rare sugar such that the rare sugar is contained or used in an amount of from 1 to 150 parts by mass based on 100 parts by mass of the isomerized sugar.

8 Claims, No Drawings

COMPOSITION FOR IMPROVING TASTE OF HIGH-INTENSITY SWEETENER AND APPLICATION THEREOF

BACKGROUND OF THE INVENTION

1. Field of the Invention

The present invention relates to a composition for improving a taste of a high-intensity sweetener, a method of improving a taste of an edible product containing a high-intensity sweetener, and an edible product in which a taste of a high-intensity sweetener is improved. More specifically, the present invention relates to a taste improving composition which can improve a taste of a high-intensity sweetener by suppressing the exhibition of a strange taste (bitterness) of the high-intensity sweetener, a method of improving a taste of an edible product, and an edible product, particularly a low-calorie edible product, in which a taste of a high-intensity sweetener is improved.

2. Description of the Related Art

Sugar and an isomerized corn syrup (high fructose corn syrup; HFCS) are sweeteners which have a favorable quality of sweetness and are popular among many people. However, recently, it has been pointed out that the excessive intake of such sugar or an isomerized corn syrup causes obesity or lifestyle diseases. In such circumstances, from health conscious point of view, an attempt has been continually made to obtain a low-calorie food or drink by substituting sugar alcohol or high-intensity sweetener having a sweetness several hundreds times higher than that of sugar for part or most of the sugar or isomerized corn syrup when producing a food or drink.

However, although the high-intensity sweetener has been frequently used as a low-calorie sweetener because the high-intensity sweetener has a sweetness several times to several thousands times higher than that of sugar (sucrose) and can exhibit a desired sweetness in a small addition amount, not only does the sweetness persist so as to deteriorate the sharpness of aftertaste, but also the aftertaste is bad such that a distinctive strange taste or bitterness is exhibited as the aftertaste. In addition, the high-intensity sweetener has a disadvantage, that is a lack of body (robustness). Therefore, the high-intensity sweetener is rarely used alone and several types of high-intensity sweeteners are used generally in combination. For example, a high-intensity sweetener such as aspartame, acesulfame potassium, or sucralose (registered trademark) has been widely used in a diet food or drink because of its high sweetness potency. However, consumers have been familiar with the taste of a so-called regular product obtained by using sugar or an isomerized corn syrup (a fructose-glucose syrup or a glucose-fructose syrup), and therefore, there are many consumers who feel unpleasant to the sweetness of a food obtained by using such a high-intensity sweetener. Many studies have been made for these three types of high-intensity sweeteners, for example, a combination use thereof with trehalose, erythritol, or the like (JP-A-2002-51723), a combination use thereof with dietary fiber (JP-A-2004-41118), and a combination use thereof with an α-glucosylated stevia extract (JP-A-2002-34501) have been disclosed, however, the current situation is that the satisfaction of the preference of consumers who have been familiar with the taste of sugar or a high-fructose corn syrup has not been obtained yet.

On the other hand, D-psicose is a rare sugar contained in molasses or the like in a very small amount. Although the sweetness of D-psicose is 60 to 70% of that of sugar (sucrose), D-psicose has almost zero calorie, and also has a high solubility, and therefore, D-psicose is expected to be applied to various foods and drinks. However, in the case of using D-psicose for imparting sweetness to a food or drink, when D-psicose is added until necessary sweetness is imparted, the added amount thereof would be much increased, and gives a much too rich taste or its sweet taste is not felt instantaneously. In consideration of these facts, single use of D-psicose is not realistic, and therefore, a method of supplementing the disadvantage of D-psicose by using a sugar alcohol in combination has been disclosed (JP-T-2008-059623).

SUMMARY

An object of the present invention is to provide an improving agent which improves or modifies a strange taste (bitterness) of a high-intensity sweetener (a composition for improving a taste of a high-intensity sweetener).

Another object of the present invention is to provide a method of improving a distinctive strange taste (particularly bitterness remaining in the mouth) of a conventional low-calorie food or drink, particularly an edible product (a food or drink) having low calories obtained by replacing part or most of the sugar or isomerized corn syrup to be added by a high-intensity sweetener (a method of improving a taste of an edible product containing a high-intensity sweetener). Still another object of the present invention is to provide an edible product, preferably a beverage or a frozen dessert, in which a taste of a high-intensity sweetener is improved, obtained by this method.

As a means for resolution thereof, the present inventors have already invented a method of using D-psicose (a sweetener) (JP-T-2008-059623 described above). However, it is difficult to produce D-psicose in a large amount at low cost at present. In addition, D-psicose is used in combination with a sugar alcohol or the like, and therefore, in consideration of a process, the process is complicated. Therefore, the present inventors made intensive studies to find a method of providing a sweet-tasting substance which can be obtained at low cost, can improve a strange taste of a high-intensity sweetener, and can be used widely in foods and drinks in the same manner as sugar or an isomerized corn syrup, and invented a method of producing a rare sugar-containing isomerized sugar syrup in the course of the studies (International Patent Application No. PCT/JP2010/55336). It has been found that in this rare sugar-containing isomerized sugar syrup, D-psicose and D-allose are contained as main rare sugars. In addition to this, it has also been found that from the results of a beer fermentation test, unidentified rare sugars which are not assimilated are also contained in the rare sugar-containing isomerized sugar syrup. Examples described in International Patent Application No. PCT/JP2010/55336 are as follows.

<Reaction of 5% isomerized corn syrup using strongly basic ion exchange resin> An isomerized corn syrup was prepared to be 5% (w/v) with a 0.1 M NaOH solution. 1100 mL of the resulting solution was sequentially passed through 45 ml of a strongly basic ion exchange resin and 26 ml of a strongly acidic ion exchange resin at a temperature of 60° C. and at a flow rate of 0.8 mL/min (strongly basic ion exchange resin: Amberlite IRA 900J OH, strongly acidic ion exchange resin: Amberlite 200 CT (H-type), column length: 30 cm, column inner diameter: 1.5 cm). Sampling was performed by collecting the reaction solution eluted over time from the column at this time, and the reaction solution was analyzed by HPLC (detector: RI, column: MCI GEL CK 08EC, Mitsubishi Chemical Corporation). After the solution was passed through the column (1000 mL), a mixed sugar liquid containing the following sugars (each numerical value in the parenthesis indicates the percentage of sugar(s) to the total amount of sugars): D-glucose (34.3%), D-mannose+D-sorbose+D-altrose (12.4%), D-fructose (25.8%), D-allose (4.1%), and D-psicose (6.3%) was obtained.

<Reaction of 40% isomerized corn syrup using strongly basic ion exchange resin> An isomerized corn syrup was prepared at 40% (w/v) with a 0.1 M NaOH solution. 1100 mL of the resulting solution was sequentially passed through 45 ml of a strongly basic ion exchange resin and 26 ml of a strongly acidic ion exchange resin at a temperature of 60° C. and at a flow rate of 0.8 mL/min (strongly basic ion exchange resin: Amberlite IRA 900J OH, strongly acidic ion exchange resin: Amberlite 200 CT (H-type), column length: 30 cm, column inner diameter: 1.5 cm). Sampling was performed by collecting the reaction solution eluted over time from the column at this time, and the reaction solution was analyzed by HPLC (detector: RI, column: MCI GEL CK 08EC, Mitsubishi Chemical Corporation). After the solution was passed through the column (1000 mL), a mixed sugar liquid containing the following sugars (each numerical value in the parenthesis indicates the percentage of sugar(s) to the total amount of sugars): D-glucose (46.2%), D-mannose+D-sorbose+D-altrose (6.3%), D-fructose (32.8%), D-allose (2.0%), and D-psicose (4.8%) was obtained.

The present inventors found that by utilizing this rare sugar-containing isomerized sugar syrup in a food or drink, particularly a beverage or a cold sweet obtained by using a high-intensity sweetener, a strange taste of the high-intensity sweetener can be effectively improved without using expensive purified D-psicose, and also without using a sugar alcohol which is used in combination for the purpose of solving the problems of D-psicose that its sweet taste does not instantaneously show and its heavy taste appears due to too much usage of D-psicose. In other words, the present inventors found an improving agent and an improving method, each of which is inexpensive, is highly convenient, and also has an excellent effect of improving the quality of taste of a high-intensity sweetener, and therefore can solve all the problems.

More specifically, the present invention relates to an improving agent (a taste improving composition) or an improving method, which utilizes an isomerized corn syrup and a rare sugar, preferably a rare sugar-containing isomerized sugar syrup obtained by isomerizing an isomerized corn syrup with an alkali at a given concentration and improves or modifies a taste of a high-intensity sweetener, specifically, one or more high-intensity sweeteners selected from the group consisting of aspartame, acesulfame potassium, sucralose (registered trademark), a stevia sweetener, saccharin, sodium saccharate, and a glycyrrhiza extract, or a method of improving a taste of an edible product (a food or drink) containing a high-intensity sweetener, and an edible product, preferably a beverage or a frozen dessert, in which a taste of a high-intensity sweetener is improved, obtained by the method.

That is, a gist of the present invention is a composition for improving a taste of a high-intensity sweetener according to any one of the following (1) to (4).

(1) A composition for improving a taste of a high-intensity sweetener, comprising an isomerized sugar and a rare sugar, wherein the rare sugar is contained in an amount of from 1 to 150 parts by mass based on 100 parts by mass of the isomerized sugar.

(2) The composition for improving a taste of a high-intensity sweetener according to the above (1), wherein the isomerized sugar and the rare sugar are a rare sugar-containing isomerized sugar syrup which is obtained by isomerizing one or more of the members selected from the group consisting of D-glucose, D-fructose, and an isomerized corn syrup with 0.005 mol/l or more of an alkali and contains sugars other than D-glucose and D-fructose in an amount of less than 60% by mass.

(3) The composition for improving a taste of a high-intensity sweetener according to the above (1), wherein the rare sugar is at least D-psicose and/or D-allose.

(4) The composition for improving a taste of a high-intensity sweetener according to the above (1), wherein the high-intensity sweetener is at least one member selected from the group consisting of aspartame, acesulfame potassium, sucralose (registered trademark), a stevia sweetener, saccharin, sodium saccharate, and a glycyrrhiza extract.

Further, another gist of the present invention is a method of improving a taste of an edible product containing a high-intensity sweetener according to any one of the following (5) to (9).

(5) A method of improving a taste of an edible product containing a high-intensity sweetener, comprises applying to the edible product an isomerized sugar, a rare sugar, and a high-intensity sweetener in combination, wherein the rare sugar is in an amount of from 1 to 150 parts by mass based on 100 parts by mass of the isomerized sugar.

(6) The method of improving a taste of an edible product containing a high-intensity sweetener according to the above (5), wherein the isomerized sugar and the rare sugar are a rare sugar-containing isomerized sugar syrup which is obtained by isomerizing one or more of the members selected from the group consisting of D-glucose, D-fructose, and an isomerized corn syrup with 0.005 mol/l or more of an alkali and contains sugars other than D-glucose and D-fructose in an amount of less than 60% by mass.

(7) The method of improving a taste of an edible product containing a high-intensity sweetener according to the above (5), wherein the rare sugar is at least D-psicose and/or D-allose.

(8) The method of improving a taste of an edible product containing a high-intensity sweetener according to the above (5), wherein the high-intensity sweetener is at least one member selected from the group consisting of aspartame, acesulfame potassium, sucralose (registered trademark), a stevia sweetener, saccharin, sodium saccharate, and a glycyrrhiza extract.

(9) The method of improving a taste of an edible product containing a high-intensity sweetener according to the above (5), wherein the edible product is selected from the group consisting of a table sweetener, a beverage, a dessert, and a chilled or frozen sweet.

Further, still another gist of the present invention is an edible product in which a taste of a high-intensity sweetener is improved according to anyone of the following (10) to (15).

(10) An edible product containing an isomerized sugar, a rare sugar, and a high-intensity sweetener, wherein the rare sugar is contained in an amount of from 1 to 150 parts by mass based on 100 parts by mass of the isomerized sugar, thereby a taste of a high-intensity sweetener is improved.

(11) The edible product according to the above (10), wherein the isomerized sugar and the rare sugar are a rare sugar-containing isomerized sugar syrup which is obtained of the members selected from the group consisting of D-glucose, D-fructose, and an isomerized corn syrup with 0.005 mol/l or more of an alkali and contains sugars other than D-glucose and D-fructose in an amount of less than 60% by mass, thereby a taste of a high-intensity sweetener is improved.

(12) The edible product according to the above (10), wherein the rare sugar is at least D-psicose and/or D-allose thereby a taste of a high-intensity sweetener is improved.

(13) The edible product according to the above (10), wherein the high-intensity sweetener is at least one member selected from the group consisting of aspartame, acesulfame potassium, sucralose (registered trademark), a stevia sweetener, saccharin, sodium saccharate, and a glycyrrhiza extract.

(14) The edible product according to the above (10), wherein the edible product is selected from the group consisting of a table sweetener, a beverage, a dessert, and a cold sweet.

(15) The edible product according to the above (10), wherein the edible product has low calories.

According to the present invention, a strange taste exhibited by replacing part or most of the sugar or isomerized corn syrup in a food or drink by a high-intensity sweetener for the purpose of obtaining a low-calorie food or drink can be improved without undergoing a complicated process, and a reduction in risk of onset of lifestyle diseases and satisfaction with respect to taste can be easily achieved at low cost.

That is, according to the present invention, an improving agent with which a strange taste (bitterness) of a high-intensity sweetener is improved or modified (a composition for improving a taste of a high-intensity sweetener) can be provided. Further, a method of improving a distinctive strange taste (particularly bitterness remaining in the mouth) of a conventional low-calorie food or drink, particularly an edible product (a food or drink) having low calories obtained by replacing part or most of the sugar or isomerized corn syrup to be added by a high-intensity sweetener (a method of improving a taste of an edible product containing a high-intensity sweetener), and an edible product, preferably a beverage or a frozen desserts, in which a taste of a high-intensity sweetener is improved, obtained by the method can be provided.

DETAILED DESCRIPTION

The taste improving composition according to the present invention comprises an isomerized sugar and a rare sugar such that the rare sugar is contained therein in an amount of 1 to 150 parts by mass, preferably 5 to 150 parts by mass, more preferably 8 to 100 parts by mass against 100 parts by mass of the isomerized corn syrup.

According to the present invention, among the isomerized corn syrup and the rare sugar, the isomerized corn syrup is an high fructose corn syrup which is widely used as a sweetener in soft drinks or other beverages. As a method of producing the high fructose corn syrup, starch is saccharified to form a saccharified liquid, and the resulting saccharified liquid is treated with glucose isomerase. A representative method is as follows. Starch is hydrolyzed with an enzyme to form dextrin. The resulting dextrin is further hydrolyzed with another enzyme to form a glucose solution, that is, a saccharified liquid. An isomerization reaction of glucose to fructose with glucose isomerase is an equilibrium reaction, and the ratio of glucose to fructose in the isomerized sugar is usually about 58 to 42. Further, in order to supplement the lack of sweetness, purified fructose is added in some cases. In this case, the final ratio of glucose to fructose is about 45 to 55. On the other hand, the rare sugar is a "sugar that rarely exists in nature" according to the definition of International Society of Rare Sugars, and is a monosaccharide that exists only in a small amount in nature. In addition, the mass production thereof is difficult, and therefore, it is considered that there are a lot of unknown properties of a rare sugar remaining to be elucidated.

As a hexose, there are 16 types of aldoses including L-allose, L-gulose, L-glucose, L-galactose, L-altrose, L-idose, L-mannose, L-talose, D-talose, D-mannose, D-idose, D-altrose, D-galactose, D-glucose, D-gulose, and D-allose; and 8 types of ketoses including L-psicose, L-sorbose, L-fructose, L-tagasose, D-tagasose, D-fructose, D-sorbose, and D-psicose. Among these hexoses, as a monosaccharide that exists in a large amount in nature, there are 7 types of monosaccharides including D-glucose, D-fructose, D-galactose, D-mannose, D-ribose, D-xylose, and L-arabinose, and all of the other monosaccharides are rare sugars.

The rare sugar-containing isomerized sugar syrup in the present invention is an isomerized sugar syrup containing a rare sugar. That is, the isomerized sugar syrup and the rare sugar according to the present invention, preferably the rare sugar-containing isomerized sugar syrup is an isomerized sugar syrup containing any of the above-described rare sugars, and the isomerized sugar syrup is a liquid sugar syrup containing glucose and fructose as main components as described above. As a method of obtaining a rare sugar, several methods are already disclosed (for example, a method of utilizing an enzyme as disclosed in JP-A-6-125776), however, at present, there is almost no method with which a rare sugar can be obtained in a large amount at low cost. As a result of intensive studies, the present inventors succeeded in obtaining a rare sugar-containing isomerized sugar syrup which contains a rare sugar in an amount of about 10% by mass at low cost by a relatively simple reaction method in which an isomerized corn syrup is isomerized with an alkali.

It was found that in the sugar composition of the rare sugar-containing isomerized sugar syrup studied in the course of completing the present invention, the identified rare sugars are D-psicose (0.5 to 17% by mass) and D-allose (0.2 to 10% by mass), and other than these, also unidentified rare sugars exist, and it is a matter of course that the rare sugars according to the present invention include these unidentified rare sugars. Further, it is found that the rare sugar-containing isomerized sugar syrup contains D-mannose, which is not a rare sugar, in an amount of from 0.5 to 40% by mass.

If the rare sugar-containing isomerized sugar syrup is a rare sugar-containing isomerized sugar obtained by allowing an isomerization reaction to proceed until the concentration of D-glucose and D-fructose is reduced to about 40% by mass, browning of the isomerized sugar proceeds significantly, and therefore, it is difficult to industrially apply the resulting product. Accordingly, the content of sugars other than D-glucose and D-fructose is preferably less than 60% by mass.

That is, the taste improving composition according to the present invention desirably contains the isomerized sugar and the rare sugar such that the rare sugar is contained therein in an amount of 1 to 150 parts by mass against 100 parts by mass of the isomerized sugar. The rare sugar is preferably contained therein in an amount of 5 to 150 parts by mass, more preferably 8 to 100 parts by mass against 100 parts by mass of the isomerized sugar.

The taste improving composition according to the present invention can be effectively used for improving a taste of an edible composition containing a high-intensity sweetener, which has a bad taste such as bitterness, astringency, or an aftertaste attributed to the high-intensity sweetener.

The taste improving composition according to the present invention has an excellent effect of improving a taste of a high-intensity sweetener having a distinctive strange taste such as bitterness, astringency, or an aftertaste (such as a taste remaining afterwards) by reducing or suppressing such a distinctive strange taste. The taste improving composition according to the present invention can exhibit the above effect on a high-intensity sweetener. The taste improving composition according to the present invention has an excellent effect of suppressing the exhibition of a strange taste (bitterness) of a high-intensity sweetener, which is at least one selected from the group consisting of aspartame, acesulfame potassium, sucralose (registered trademark), a stevia sweetener, saccharin, sodium saccharate, and a glycyrrhiza extract, and can be preferably used for improving a taste of such a high-intensity sweetener.

Incidentally, the high-intensity sweetener, to which the taste improving composition according to the present invention is applied, may comprise one type of high-intensity sweetener alone, or may comprise two or more different types of high-intensity sweeteners in an arbitrary combination. The combination example is not particularly limited.

In addition to the above-described components, the taste improving composition according to the present invention can also contain a food additive such as a flavoring, a pigment, an antioxidant, a preservative, a vitamin, or a mineral such as calcium (such as calcium lactate or calcium gluconate), iron, magnesium, phosphorus, potassium, or sodium; or an additive for use in a pharmaceutical preparation or a quasi drug for oral administration or oral cavity within a range that does not inhibit the effect of the present invention.

Further, the form of the taste improving composition according to the present invention is not particularly limited, and any form such as a powder, a granule, a solid (such as a tablet or a pill), or a liquid may be adopted.

The usage of the high-intensity sweetener having a sweetness several hundreds times higher than that of sugar is such that part or most of the sugar or isomerized sugar to be used in the production of a food or drink is replaced by the high-intensity sweetener, whereby a low-calorie food or drink is obtained. An edible product, particularly a beverage or a frozen dessert, to which the method according to the present invention is applied, may be any as long as it contains the above-described high-intensity sweetener even in a small amount. In general, a problem arises such that such a high-intensity sweetener exhibits a strange taste, and therefore, there is no case that such a high-intensity sweetener is used in a large amount, and the using amount thereof is at most within a range of about 0.001 to 0.1% by mass based on the amount of the product, though it depends on the degree of sweetness of the high-intensity sweetener to be used.

The method of improving a taste of an edible product containing a high-intensity sweetener according to the present invention comprises using an isomerized sugar, a rare sugar, and a high-intensity sweetener in combination, wherein the rare sugar is used in an amount of from 1 to 150 parts by mass, preferably from 5 to 150 parts by mass, more preferably from 8 to 100 parts by mass based on 100 parts by mass of the isomerized sugar.

That is, the taste improving composition according to the present invention can be added and blended in an edible product containing a high-intensity sweetener for the purpose of improving a taste of the edible product or can be used as one of the raw material components of the edible product when the edible product is produced. Incidentally, the blending ratio of the taste improving composition in this case can also be determined in the same manner based on the above-described ratio.

The present invention relates to a method of improving a distinctive strange taste of a high-intensity sweetener, particularly relates to a method of improving a distinctive strange taste of a high-intensity sweetener by using a rare sugar-containing isomerized sugar when a beverage or a cold sweet characterized by having low calories is produced. The rare sugar-containing isomerized sugar according to the present invention refers to an isomerized corn syrup containing a rare sugar. The method of improving a taste of an edible product containing a high-intensity sweetener according to the present invention can be performed by using a high-intensity sweetener, an isomerized corn syrup, and a rare sugar in combination as the components of the edible product. A specific method of using these components in combination is not particularly limited, and for example, a method in which an isomerized sugar and a rare sugar are added and blended in an edible product containing a high-intensity sweetener, a method in which, when an edible product is produced, by adding them to a high-intensity sweetener or other raw material components, an isomerized sugar and a rare sugar are contained, or the like can be exemplified. Incidentally, the isomerized sugar and the rare sugar to be used in combination with the edible product may be used separately or may be used in the form of the above-described taste improving composition according to the present invention.

As the high-intensity sweetener to be used in the edible product containing a high-intensity sweetener, to which the present invention is applied, those to be used for replacing part or most of the sugar or isomerized corn syrup in an edible product by a high-intensity sweetener for the purpose of obtaining a low-calorie product as described above can be widely exemplified, and specific examples thereof include high-intensity sweeteners having a bad taste such as bitterness, astringency, or an aftertaste (such as a taste remaining afterwards) including aspartame, acesulfame potassium, alitame, a glycyrrhiza extract, sucralose (registered trademark), a stevia sweetener, thaumatin, saccharin, sodium saccharate, and neotame. The high-intensity sweetener is preferably at least one selected from the group consisting of aspartame, acesulfame potassium, sucralose (registered trademark), a stevia sweetener, saccharin, sodium saccharate, and a glycyrrhiza extract.

The edible product, to which the present invention is applied, is not particularly limited as long as it is a product (a food or drink) which contains one or more high-intensity sweeteners and is edible. The food or drink is not particularly limited, however, examples thereof preferably include general beverages such as fruit juice derived from a fruit or a vegetable, fruit juice containing squeezed juice or the like, fruit juice containing a granular fruit, fruit beverages, fruit juice beverages, fruit juice-containing beverages, vegetable juice, vegetable-containing juice, fruit and vegetable-containing mix juice; carbonated beverages such as cola, ginger ale, and soda; refreshing beverages such as sports drink and near water; tea-based or non-alcoholic beverages such as coffee, cocoa, black tea, green powdered tea, green tea, and oolong tea; and beverages containing a milk component such as milk beverages, milk component-containing coffee, cafe au lait, milk tea, green powdered tea-containing milk, fruit-containing milk beverages, yogurt drink, and lactic acid beverages; general sweet products such as desserts (foods to which sweetness is imparted and is eaten as a refreshment or after a meal) such as yogurt, jelly, jelly drink, pudding, Bavarian cream, blancmange, and mousse; frozen desserts such as ice cream products (foods obtained by adding a sweetener and other various kinds of raw materials to a milk product, followed by stirring and freezing) such as ice cream, ice milk, and lacto ice, and sweet ice products (foods obtained by adding other various kinds of raw materials to a sugar liquid, followed by stirring and freezing) such as sherbet and sweet crushed ice; sweet stuff such as baked sweets and steamed sweets including Western-style sweets and Japanese-style sweets such as cakes, crackers, biscuits, and steamed buns with filling; rice sweets, snacks, chewing gum, hard candy, nougat candy, and jelly beans; sweeteners such as seasoning sweeteners and table sweeteners; sauces such as fruit flavored sauces and chocolate sauces; creams such as butter cream, flour paste, and whipped cream; jams such as strawberry jam and marmalade; bread including sweet bread and the like; general seasonings such as Tare (sauce) to be used for boiled meat, boiled chicken, boiled eel, or the like; tomato ketchup, Worcester sauce, and noodle sauce; products made of boiled fish paste such as kamaboko (boiled fish sausages) and meat processed products such as pork sausages; retort pouch foods, Japanese pickles, foods boiled in soy sauce, delicacies, prepared foods, frozen foods, and other agricultural and livestock and fishery processed products. Among these, as a preferred food, beverages, table seasonings, desserts, and cold sweets can be exemplified. Particularly preferred are beverages and cold sweets. In particular, according to the present invention, a taste of a beverage containing a high-intensity sweetener can be favorable improved by significantly suppressing a bad taste such as bitterness, astringency, or an aftertaste (such as a taste remaining afterwards) attributed to the high-intensity sweetener.

The taste improving composition according to the present invention contains an isomerized sugar as a constituent component, and the composition can improve a strange taste exhibited by replacing part or most of the sugar or isomerized corn syrup in a food or drink by a high-intensity sweetener for the purpose of obtaining a low-calorie food or drink. Therefore, the ratio of the isomerized sugar and the rare sugar to be added in an edible product may be appropriately adjusted according to the degree and quality of sweetness required for the final product, and is not particularly limited. Accordingly, in the case of utilizing the taste improving composition according to the present invention, it is not necessary to take into consideration particularly in detail the addition amount of the taste improving composition (an isomerized sugar and a rare sugar, preferably a rare sugar-containing isomerized sugar) according to the present invention based on the amount of the high-intensity sweetener contained in the product. The taste improving composition according to the present invention may be added by setting the lower limit of the addition amount of the rare sugar to at least 0.14% by mass to 0.4% by mass in the final product.

The edible product obtained by the taste improving method according to the present invention may be any as long as the finally obtained product contains a high-intensity sweetener, an isomerized sugar, and a rare sugar, and the addition time and addition order of the respective components are not particularly limited. Further, to the edible product, an additive which is permitted in the field of food, pharmaceutical preparation, or quasi drug such as a flavoring, a pigment, an antioxidant, a preservative, a vitamin, or a mineral such as calcium (such as calcium lactate or calcium gluconate), iron, magnesium, phosphorus, potassium, or sodium may be added as needed within a range that does not affect the effect of the present invention.

By using the method of improving a taste of an edible product containing a high-intensity sweetener according to the present invention, an edible product having a favorable taste, the taste of which is improved by reducing a distinctive strange taste such as bitterness, astringency, or an aftertaste attributed to the high-intensity sweetener or suppressing the exhibition thereof can be provided.

The edible product according to the present invention contains a high-intensity sweetener, an isomerized sugar, and a rare sugar. As the edible product, a beverage and a frozen sweet will be described as examples.

In the present invention, the beverage or frozen sweet in which a strange taste derived from a high-intensity sweetener is improved should satisfy the requirement that the product contains at least D-allose and/or D-psicose in an appropriate amount. However, by incorporating a rare sugar other than D-allose and D-psicose, or a sugar, or the like within a range that does not have an adverse effect on the quality, a beverage or a frozen sweet having a better quality of taste or the like can be obtained. In the case of using a rare sugar-containing isomerized sugar, the type or amount of a rare sugar to be generated by the isomerization varies depending on a reaction condition or the like for the isomerization with an alkali, and therefore, it is possible to improve the quality of taste by utilizing the difference in the reaction condition.

In the beverage or frozen sweet of the present invention in which a strange taste derived from a high-intensity sweetener is improved, the amount of the rare sugar-containing isomerized sugar required for improving the quality of taste thereof is not particularly limited as long as a desired effect can be obtained, however, there is a preferred concentration of the rare sugar-containing isomerized sugar according to the type of beverage or frozen sweet.

For example, in the case of a beverage which originally contains an isomerized corn syrup in a large amount such as a carbonated beverage or a sports drink, by adding the taste improving composition according to the present invention such that part or the whole of the isomerized corn syrup to be added is replaced by a rare sugar-containing isomerized sugar and the amount of the rare sugar contained in the final product is 0.14% by mass to 0.4% by mass or more, the effect of improving the quality of taste thereof can be effectively obtained.

On the other hand, in the case of a beverage which does not contain an isomerized corn syrup so much in some cases such as a coffee beverage, by adding the taste improving composition according to the present invention such that the isomerized corn syrup contained therein as whole as possible is replaced by a rare sugar-containing isomerized sugar and the amount of the rare sugar contained in the final product is within the above range, the effect of improving the quality of taste thereof can be effectively obtained. It is particularly worth noting that in the case of applying the present invention to a coffee beverage, not only can an effect of improving a strange taste derived from a high-intensity sweetener be obtained, but also an effect of decreasing an unfavorable strange taste such as harsh bitterness which is generated by oxidation and is peculiar to a coffee beverage can be obtained without deteriorating a robust taste and a deep taste of coffee itself.

Also in a frozen sweet, as a sweetener which has a pleasant taste and can be obtained at relatively low cost, an isomerized corn syrup is often used. However, since the isomerized corn syrup is composed of monosaccharides, if the using amount thereof is large, the resulting frozen sweet is liable to melt, or flavor disturbance called "nodoyake" (painful throat) is caused, and therefore, the blending amount thereof in a frozen sweet is up to 3 to 5% in many cases. By adding the taste improving composition according to the present invention such that 30 to 100% by mass of the isomerized corn syrup is replaced by a rare sugar-containing isomerized sugar, in other words, the amount of the rare sugar contained in the final product is 0.15% by mass or more, preferably 0.15 to 0.4% by mass or more, a strange taste (bitterness) derived from the high-intensity sweetener can be effectively improved in the same manner as in the case of a beverage.

The high-intensity sweetener is a sweetener having a sweetness several times to several thousands times higher than that of sugar, and examples thereof include aspartame, neotame, alitame, stevia (including a stevia extract, a stevia derivative such as an enzyme-treated stevia obtained by treating stevia with an enzyme to add glucose thereto, and rebaudioside A which is a substance having the best quality of sweetness among the sweet-tasting components of stevia), a glycyrrhiza extract, sucralose (registered trademark), acesulfame potassium, saccharin, sodium saccharate, sodium cyclamate, dulcin, thaumatin, and monellin. The effect of the present invention is exhibited in a beverage or a frozen sweet containing at least one of aspartame, stevia (including a stevia extract, a stevia derivative such as an enzyme-treated stevia obtained by treating stevia with an enzyme to add glucose thereto, and rebaudioside A which is a substance having the best quality of sweetness among the sweet-tasting components of stevia), a glycyrrhiza extract, sucralose (registered trademark), acesulfame potassium, saccharin, and sodium saccharate among the above-described sweeteners.

The beverage or frozen sweet, to which the method according to the present invention is applied, may be any as long as the beverage or frozen sweet contains the above-described high-intensity sweetener even in a small amount. In general, a problem arises such that such a high-intensity sweetener exhibits a strange taste, and therefore, there is no case that such a high-intensity sweetener is used in a large amount, and the using amount thereof is at most within a range of about 0.001 to 0.1% by mass based on the amount of the product, though it depends on the degree of sweetness of the high-intensity sweetener to be used. Accordingly, in the case of utilizing the present invention, it is not necessary to take into consideration particularly in detail the addition amount of the rare sugar based on the amount of the high-intensity sweetener contained in the product, and as described above, by adding the taste improving composition according to the present invention by setting the amount of the rare sugar in the final product of a beverage or a frozen sweet to 0.14% by mass to 0.4% by mass or more, an effect of improving the quality of taste thereof can be effectively obtained. In particular, a taste of a beverage containing a high-intensity sweetener can be improved by significantly suppressing a distinctive strange taste such as bitterness, astringency, or an aftertaste (such as a taste remaining afterwards) attributed to the high-intensity sweetener.

The beverage according to the present invention can be prepared by a conventional procedure. For example, respective components are mixed and dissolved in purified water which is not more than a specified amount. Then, the volume of the resulting mixture is adjusted to the specified amount, and if necessary, filtration, sterilization, carbonation, or the like is performed, whereby the beverage is prepared. The addition of the rare sugar-containing isomerized sugar may be performed at any time during the production process until the final product is obtained, or a method in which the rare sugar-containing isomerized sugar is added after the final product is obtained may be adopted.

Further, as the type of beverage, a variety of beverages in the field of food such as refreshing beverages, health beverages, fruit juice beverages, and nutritional supplement beverages; and a variety of beverages to be used as pharmaceutical preparations or quasi drugs such as drinkable preparations and syrup preparations can be exemplified. Further, within a range that does not deteriorate the effect of the present invention, a component which is generally used in a beverage such as a vitamin or a salt thereof, an amino acid or a salt thereof, a plant extract, a mineral, starch, a modified starch, a sugar alcohol, dextrin, a dietary fiber, indigestible dextrin, a preservative, or a colorant can also be blended therein.

The frozen sweet in the present invention includes ice cream, ice milk, and lacto ice defined in "Ministerial Ordinance on Milk and Milk products concerning Compositional Standards, etc." issued on the basis of Food Sanitation Act in Japan, and frozen sweets defined in "Standards and criteria for food and food additives, etc." (Ministry of Health and Welfare Notification) issued on the basis of Food Sanitation Act in Japan. Each product can be prepared according to a conventional procedure, and the addition of the rare sugar-containing isomerized sugar may be performed at anytime during the production process, or a method in which the rare sugar-containing isomerized sugar is added after the final product is obtained may be adopted.

The beverage or frozen sweet obtained by the method according to the present invention as described above can improve a strange taste derived from the high-intensity sweetener added for the purpose of reducing calories, and therefore, both health aspect and luxury aspect can be achieved, and the present invention has a very high value from the viewpoint of industrial application.

Hereinafter, the present invention will be more specifically described with reference to Examples, however, the technical scope of the present invention is not limited to these examples. Incidentally, the symbol "%" indicates "% by mass" unless otherwise specified.

EXAMPLES

An isomerized sugar syrup containing a rare sugar used in Examples was produced by the following method.

First, a commercially available isomerized corn syrup (fructose content: 42%) was prepared at 30% (w/v) with a 0.1 M NaOH solution, and the resulting solution was passed through a packed strong basic ion exchange resin (resin: Amberlite IRA 900J [OH]) at a temperature of 60° C. and at an SV (space velocity=flow amount (L)/time (h)/resin amount (L)) of 1. Subsequently, an eluted sugar liquid was purified and condensed using an ion exchange resin according to a conventional procedure, whereby an isomerized sugar syrup containing a rare sugar was obtained.

Collected the reaction solution eluted from the column at this time, and was analyzed by HPLC (detector: RI, column: MCI GEL CK 08EC, Mitsubishi Chemical Corporation). The amount of each sugar was calculated from the peak area, and it was found that the amount of D-glucose was about 44%, the amount of D-fructose was about 32%, the amount of D-psicose was about 6%, the amount of D-allose was about 1.5%, and the amount of the other monosaccharide rare sugars was about 6%.

Examples 1 to 5

Examples of Cola Beverage

Cola beverages were prepared according to the compositions shown in the following Table 1. (The solid content derived from sugars (Brix) was set to 3.5 g in 100 mL of the resulting beverage)

TABLE 1

Composition of cola beverage (Unit: g)

| | Comparative example | | | | | Example | | | | |
|---|---|---|---|---|---|---|---|---|---|---|
| | 1 | 2 | 3 | 4 | 5 | 1 | 2 | 3 | 4 | 5 |
| Isomerized corn syrup (fructose content: 42%, Brix: 70) | 5.0 | 4.6 | 4.2 | 3.8 | 4.6 | 4.0 | 3.0 | 2.0 | 1.0 | — |
| D-psicose (powder) | — | 0.3 | 0.6 | 0.9 | 0.25 | — | — | — | — | — |
| D-allose (powder) | — | — | — | — | 0.05 | — | — | — | — | — |
| Rare sugar-containing isomerized sugar syrup*1 (fructose content: 32%, Brix: 75) | — | — | — | — | — | 0.93 | 1.87 | 2.80 | 3.73 | 4.67 |
| Stevia*2 | | | | | | 0.03 | | | | |
| O-phosphoric acid | | | | | | 0.07 | | | | |
| Sodium citrate | | | | | | 0.04 | | | | |
| Caffeine*3 | | | | | | 0.01 | | | | |
| Caramel pigment*4 | | | | | | 0.28 | | | | |
| Cola base*5 | | | | | | 0.10 | | | | |
| Water, carbonated water | | | | | | filled up to 100 mL in total | | | | |

*1Contains D-allose (about 1.5%), D-psicose (about 6%), and glucose (44%). (Other than these, D-sorbose and unidentified rare sugars are contained in an amount of about 8%.)
*2"Rebaudioside A-97", PureCircle Limited
*3"Cha no Moto Caffeine" (extracted substance), Shiratori Pharmaceutical Co., Ltd.
*4"Taiyo Caramel Z-100", Semba Tohka Industries Co., Ltd.
*5"Cola base #6343", Takata Koryo Co., Ltd.

Sensory evaluation was performed by 10 panelists for the cola beverages of Comparative examples 1 to 5 and Examples 1 to 5 obtained by mixing the respective components according to the composition shown in Table 1. At this time, the temperature of each sample was set to about 15° C. and the temperature of the room was set to about 26° C. The results are shown in the following Table 2. Each panelist scored each beverage with respect to richness (a deep taste, mainly sweetness expanding in the mouth), aftertaste (free from a strange taste, particularly bitterness), and sweetness balance (overall balance of sweetness in terms of sweetness felt first in the mouth and sweetness remaining afterwards) as follows: the case where the beverage was very favorable was evaluated as 5; the case where the beverage was favorable was evaluated as 4; the case where the beverage was somewhat favorable was evaluated as 3; the case where the beverage was somewhat unfavorable was evaluated as 2; and the case where the beverage was unfavorable was evaluated as 1. Then, an average point was calculated for each evaluation item, and the obtained results are shown in the table. Incidentally, the beverage of Comparative example 1 was scored 2 for all the evaluation items (control), and evaluation was performed for the other beverages with reference to the beverage of Comparative example 1. It was determined that in the case where the sum of the average points was 10.0 or more, the strange taste derived from the high-intensity sweetener was improved and the overall balance of the quality of taste was favorable.

TABLE 2

Results of sensory evaluation

| | Richness | Aftertaste | Sweetness balance | Sum of average points for respective items |
|---|---|---|---|---|
| Comparative example 1 | 2 | 2 | 2 | 6 |
| Comparative example 2 | 3.1 | 2.0 | 2.2 | 7.3 |
| Comparative example 3 | 3.3 | 2.2 | 2.8 | 8.3 |
| Comparative example 4 | 3.4 | 3.1 | 3.5 | 10.0 |
| Comparative example 5 | 3.2 | 3.5 | 3.3 | 10.0 |
| Example 1 | 2.1 | 3.8 | 3.8 | 9.7 |
| Example 2 | 2.8 | 4.2 | 3.6 | 10.6 |
| Example 3 | 3.0 | 4.8 | 4.2 | 12.0 |
| Example 4 | 3.0 | 4.9 | 4.5 | 12.4 |
| Example 5 | 3.1 | 5.0 | 5.0 | 13.1 |

From the results of the sensory evaluation of the beverage of Comparative example 4, it was confirmed that by replacing part of the isomerized corn syrup by D-psicose (0.9%), all of the evaluation items: richness, aftertaste, and sweetness balance were improved, and also it was found that by replacing part or the whole of the isomerized corn syrup by the rare sugar-containing isomerized sugar syrup, all of the evaluation items: richness, aftertaste, and sweetness balance were improved (Examples 2 to 5). The amount of D-psicose contained or the total amount of D-psicose and D-allose contained in any of the beverages of Examples 2 to 5 was smaller than the amount of D-psicose contained in the beverage of Comparative example 4 which was determined to have a favorable quality of taste, and therefore, it was considered that the effect of improving the strange taste of the high-intensity sweetener by the rare sugar-containing isomerized sugar is not attributed to the effect of D-psicose alone, but is attributed to the synergistic effect of D-psicose and D-allose, or D-psicose, D-allose and other rare sugars.

Accordingly, in order to confirm whether the effect of the rare sugar-containing isomerized sugar is attributed to the synergistic effect of only D-psicose and D-allose or to the synergistic effect of D-psicose, D-allose, and other rare sugars, a cola beverage (Comparative example 5) was produced such that the total amount of D-psicose and D-allose was the same as the amount of D-psicose contained in the beverage of Comparative example 2 and also the total amount of D-psicose and D-allose was almost the same as that in the beverage of Example 4, and sensory evaluation was performed. As a result, the beverage of Comparative example 5 showed more favorable results with respect to aftertaste and sweetness balance than the beverage of Comparative example 2, and therefore, a certain synergistic effect of the combination use of D-psicose and D-allose could be confirmed. However, the beverage of Comparative example 5 did not show results as favorable as the beverage of Example 4 with respect to aftertaste and sweetness balance, and therefore, it was presumed that a synergistic effect is brought about by D-psicose and D-allose and also rare sugars other than D-psicose and D-allose, and the like contained in the rare sugar-containing isomerized sugar syrup.

Examples 6 to 10

Examples of Soda Beverages

Soda beverages were prepared according to the compositions shown in the following Table 3. (The solid content derived from sugars (Brix) was set to 3.5 g in 100 mL of the resulting beverage)

TABLE 3

Composition of soda beverage (Unit: g)

| | Comparative example | | | | | Example | | | | |
|---|---|---|---|---|---|---|---|---|---|---|
| | 6 | 7 | 8 | 9 | 10 | 6 | 7 | 8 | 9 | 10 |
| Isomerized corn syrup (fructose content: 42%, Brix: 70) | 5.0 | 4.6 | 4.2 | 3.8 | 4.6 | 4.0 | 3.0 | 2.0 | 1.0 | — |
| D-psicose (powder) | — | 0.3 | 0.6 | 0.9 | 0.25 | — | — | — | — | — |
| D-allose (powder) | — | — | — | — | 0.05 | — | — | — | — | — |
| Rare sugar-containing isomerized sugar syrup*[1] (fructose content: 32%, Brix: 75) | — | — | — | — | — | 0.93 | 1.87 | 2.80 | 3.73 | 4.67 |
| Acesulfame potassium*[2] | | | | | | 0.01 | | | | |
| Sucralose ®*[3] | | | | | | 0.01 | | | | |
| Citric acid | | | | | | 0.08 | | | | |
| Flavoring*[4] | | | | | | 0.10 | | | | |
| Water, carbonated water | | | | | Balance to give 100 mL in total | | | | | |

*[1]Contains D-allose (about 1.5%), D-psicose (about 6%), and glucose (44%). (Other than these, D-sorbose and unidentified rare sugars are contained in an amount of about 8%.)
*[2]"Sunett ®", Nutrinova
*[3]San-Ei Gen F.F.I., Inc.
*[4]"Soda essence #7076", Takata Koryo Co., Ltd.

Sensory evaluation was performed by 10 panelists for the soda beverages of Comparative examples 6 to 10 and Examples 6 to 10 obtained by mixing the respective components according to the composition shown in Table 3. At this time, the temperature of each sample was set to about 15° C. and the temperature of the room was set to about 26° C. The results are shown in the following Table 4. Each panelist scored each beverage with respect to richness (a deep taste, mainly sweetness expanding in the mouth), aftertaste (free from a strange taste, particularly bitterness), and sweetness balance (overall balance of sweetness in terms of sweetness felt first in the mouth and sweetness remaining afterwards) as follows: the case where the beverage was very favorable was evaluated as 5; the case where the beverage was favorable was evaluated as 4; the case where the beverage was somewhat favorable was evaluated as 3; the case where the beverage was somewhat unfavorable was evaluated as 2; and the case where the beverage was unfavorable was evaluated as 1. Then, an average point was calculated for each evaluation item, and the obtained results are shown in the table. Incidentally, the beverage of Comparative example 6 was scored 2 for all the evaluation items, and evaluation was performed for the other beverages with reference to the beverage of Comparative example 6. It was determined that in the case where the sum of the average points was 10.0 or more, the strange taste derived from the high-intensity sweetener was improved and the overall balance of the quality of taste was favorable.

TABLE 4

Results of sensory evaluation

| | Richness | Aftertaste | Sweetness balance | Sum of average points for respective items |
|---|---|---|---|---|
| Comparative example 6 | 2 | 2 | 2 | 6 |
| Comparative example 7 | 3.0 | 2.8 | 2.2 | 8.0 |
| Comparative example 8 | 3.4 | 3.0 | 3.1 | 9.5 |
| Comparative example 9 | 3.6 | 3.9 | 3.2 | 10.7 |
| Comparative example 10 | 3.3 | 3.4 | 3.3 | 10.0 |
| Example 6 | 2.2 | 4.2 | 3.4 | 9.8 |

TABLE 4-continued

Results of sensory evaluation

| | Richness | Aftertaste | Sweetness balance | Sum of average points for respective items |
|---|---|---|---|---|
| Example 7 | 2.7 | 4.1 | 3.9 | 10.7 |
| Example 8 | 3.1 | 4.7 | 4.1 | 11.9 |
| Example 9 | 3.2 | 4.8 | 4.3 | 12.3 |
| Example 10 | 3.4 | 5.0 | 4.9 | 13.3 |

From the results of the sensory evaluation of the beverage of Comparative example 9, it was confirmed that by replacing part of the isomerized corn syrup by D-psicose (0.9%), all of the evaluation items: richness, aftertaste, and sweetness balance were improved, and also it was found that by replacing part or the whole of the isomerized corn syrup by the rare sugar-containing isomerized sugar syrup, all of the evaluation items: richness, aftertaste, and sweetness balance were improved (Examples 7 to 10). The amount of D-psicose contained or the total amount of D-psicose and D-allose contained in any of the beverages of Examples 7 to 10 was smaller than the amount of D-psicose contained in the beverage of Comparative example 9 which was determined to have a favorable quality of taste, and therefore, it was considered that the effect of improving the strange taste of the high-intensity sweetener by the rare sugar-containing isomerized sugar is not attributed to the effect of D-psicose alone, but is attributed to the synergistic effect of D-psicose and D-allose, or D-psicose, D-allose and other rare sugars.

Accordingly, in order to confirm whether the effect of the rare sugar-containing isomerized sugar syrup is attributed to the synergistic effect of only D-psicose and D-allose or to the synergistic effect of D-psicose, D-allose, and other rare sugars, a soda beverage (Comparative example 10) was produced such that the total amount of D-psicose and D-allose was the same as the amount of D-psicose contained in the beverage of Comparative example 7 and also the total amount of D-psicose and D-allose was almost the same as that in the beverage of Example 9, and sensory evaluation was performed. As a result, the beverage of Comparative example 10 showed more favorable results with respect to aftertaste and sweetness balance than the beverage of Comparative example 7, and therefore, a certain synergistic effect of the combination use of D-psicose and D-allose could be confirmed. However, the beverage of Comparative example 10 did not show results as favorable as the beverage of Example 9 with respect to aftertaste and sweetness balance, and therefore, it was presumed that a synergistic effect is brought about by D-psicose and D-allose and also rare sugars other than D-psicose and D-allose, and the like contained in the rare sugar-containing isomerized sugar syrup.

Examples 11 to 14

Lacto ice products were prepared according to the compositions shown in the following Table 5.

TABLE 5

Composition of lacto ice (Unit: % by mass)

| | Comparative example | | | | Example | | | |
|---|---|---|---|---|---|---|---|---|
| | 11 | 12 | 13 | 14 | 11 | 12 | 13 | 14 |
| Milk | | | | 50.0 | | | | |
| Palm oil | | | | 6.0 | | | | |
| Powdered skim milk | | | | 5.0 | | | | |
| Starch syrup (DE 40) (in terms of solid content) | | | | 1.0 | | | | |
| Isomerized corn syrup (fructose content: 42%) (in terms of solid content) | 4.0 | | 3.0 | | 2.0 | — | 2.0 | — |
| Rare sugar-containing isomerized sugar syrup*[1] (fructose content: 32%) (in terms of solid content) | — | | 1.0 | | 2.0 | 4.0 | 2.0 | 4.0 |
| Egg yolk | | | | 2.5 | | | | |
| Glycerin fatty acid ester*[2] | | | | 0.3 | | | | |
| Guar gum*[3] | | | | 0.15 | | | | |
| Stevia*[4] | 0.02 | — | 0.02 | — | 0.02 | — | | |
| Acesulfame potassium*[5] | — | 0.01 | — | 0.01 | — | | 0.01 | |
| Aspartame*[6] | — | 0.01 | — | 0.01 | — | | 0.01 | |
| Vanilla flavoring*[7] | | | | 0.1 | | | | |
| Water | Balance to give 100.0 g in total with water | | | | | | | |

*[1]Contains D-allose (about 1.5%), D-psicose (about 6%), and glucose (44%). (Other than these, D-sorbose and unidentified rare sugars are contained in an amount of about 8%.)
*[2]"Homogen DM", San-Ei Gen F.F.I., Inc.
*[3]"San Best NN-153", San-Ei Gen F.F.I., Inc.
*[4]"Steviol Glycosides (SG-95)", PureCircle Limited
*[5]"Sunett", Takeda Chemical Industries Ltd.
*[6]"Pal Sweet Diet", Ajinomoto Co., Inc.
*[7]"Vanilla Essence Bourbon", Takata Koryo Co., Ltd.

Sensory evaluation was performed by 10 panelists for the lacto ice products of Comparative examples 11 to 14 and Examples 11 to 14 obtained by mixing the respective components according to the composition shown in Table 5. At this time, the temperature of each sample was set to about −10° C. and the temperature of the room was set to about 26° C. The results are shown in the following Table 6. Each panelist scored each product with respect to richness (a deep taste, mainly sweetness expanding in the mouth), aftertaste (free from a strange taste, particularly bitterness), and sweetness balance (overall balance of sweetness in terms of sweetness felt first in the mouth and sweetness remaining afterwards) as follows: the case where the product was very favorable was evaluated as 5; the case where the product was favorable was evaluated as 4; the case where the product was somewhat favorable was evaluated as 3; the case where the product was somewhat unfavorable was evaluated as 2; and the case where the product was unfavorable was evaluated as 1. Then, an average point was calculated for each evaluation item, and the obtained results are shown in the table. Incidentally, the product of Comparative example 11 was scored 2 for all the evaluation items, and evaluation was performed for the other products with reference to the product of Comparative example 11. It was determined that in the case where the sum of the average points was 10.0 or more, the strange taste derived from the high-intensity sweetener was improved and the overall balance of the quality of taste was favorable.

TABLE 6

Results of sensory evaluation

| | Richness | Aftertaste | Sweetness balance | Sum of average points for respective items |
|---|---|---|---|---|
| Comparative example 11 | 2 | 2 | 2 | 6 |

TABLE 6-continued

Results of sensory evaluation

| | Richness | Aftertaste | Sweetness balance | Sum of average points for respective items |
|---|---|---|---|---|
| Comparative example 12 | 2.0 | 2.5 | 2.4 | 6.9 |
| Comparative example 13 | 2.9 | 2.5 | 2.9 | 8.3 |
| Comparative example 14 | 2.6 | 3.0 | 3.3 | 8.9 |
| Example 11 | 3.8 | 3.6 | 3.3 | 10.7 |
| Example 12 | 4.2 | 4.4 | 4.0 | 12.6 |
| Example 13 | 3.9 | 4.5 | 3.9 | 11.8 |
| Example 14 | 4.1 | 4.5 | 4.2 | 12.8 |

The products of Examples 11 to 14 showed more favorable results with respect to richness, aftertaste, and sweetness balance than the products of Comparative examples 11 and 12. That is, it was found that the rare sugar-containing isomerized sugar syrup not only has an effect of improving the bitterness remaining in the mouth derived from stevia, but also improves the imbalance of sweetness, which cannot be improved by the combination use of aspartame and acesulfame potassium, to a favorable balance of sweetness, and moreover, the rare sugar-containing isomerized sugar syrup can mask the bitterness remaining as an aftertaste derived from acesulfame potassium.

Further, there is a tendency that when a food or drink at a low temperature (5° C. or lower) is taken, it becomes difficult to feel a sweet taste as compared with the case where a food or drink at room temperature is taken. However, there are many additional comments made by the panelists that in the case of the products of Examples, "a stronger sweet taste was felt as compared with the products of Comparative examples". Accordingly, it was found that only by replacing part of the isomerized corn syrup in a food or drink by a rare sugar-containing isomerized sugar syrup, the degree of sweetness of the food or drink to be taken at a low temperature can be increased, that is, an effect that the using amount of an isomerized corn syrup can be reduced can also be expected.

The present invention provides, as a use invention, a novel application of an isomerized sugar containing a rare sugar which is used in a variety of applications (for example, for restriction of calorie intake in the case of obesity or the like, for suppression of increase in blood glucose level due to a disease such as diabetes, etc.) such as a diet sweetener, and has a characteristic as "a low-calorie sweetener", particularly D-psicose and/or D-allose (a taste improving composition that improves a distinctive strange taste (particularly bitterness remaining in the mouth) of a conventional low-calorie food or drink, particularly an edible product (a food or drink) having low calories obtained by replacing part or most of the sugar or isomerized corn syrup to be added by a high-intensity sweetener).

The invention claimed is:

1. A method of providing an edible product containing a high-intensity sweetener, comprises:
    isomerizing one or more of members selected from the group consisting of D-glucose, D-fructose, and an isomerized corn syrup, thereby providing an isomerized sugar which comprises rare sugars comprising D-psicose, D-allose and a rare sugar other than D-psicose and D-allose; and
    adding to the edible product the isomerized sugar containing the rare sugars, and the high-intensity sweetener in combination in effective amounts thereof to suppress a bitterness of the high-intensity sweetener,
    wherein the rare sugars are in an amount of from 1 to 150 parts by mass based on 100 parts by mass of the isomerized sugar.

2. The method according to claim 1, wherein said isomerization comprises isomerizing said one or more of the members selected from the group consisting of D-glucose, D-fructose, and an isomerized corn syrup with 0.005 mol/l or more of an alkali, and the obtained isomerized sugar contains sugars other than D-glucose and D-fructose in an amount of less than 60% by mass.

3. The method according to claim 1, which contains 0.5-17% by mass of D-psicose and 0.2-10% by mass of D-allose based on the total amount of the isomerized sugar.

4. The method according to claim 1, wherein the high-intensity sweetener is at least one member selected from the group consisting of aspartame, acesulfame potassium, sucralose, a stevia sweetener, saccharin, sodium saccharate, and a glycyrrhiza extract.

5. The method according to claim 1, wherein the edible product is selected from the group consisting of a table sweetener, a beverage, a dessert, and a chilled or frozen sweet.

6. The method according to claim 1, which contains the rare sugar other than D-psicose and D-allose at an amount of about 6% by mass based on the total amount of the isomerized sugar.

7. The method according to claim 1, wherein no purified D-psicose is added to the edible product.

8. The method according to claim 1, wherein no sugar alcohol is added to the edible product.

* * * * *